March 5, 1963   R. K. BUTLER   3,079,647
BOTTOM ROLL STAND
Filed Sept. 9, 1960
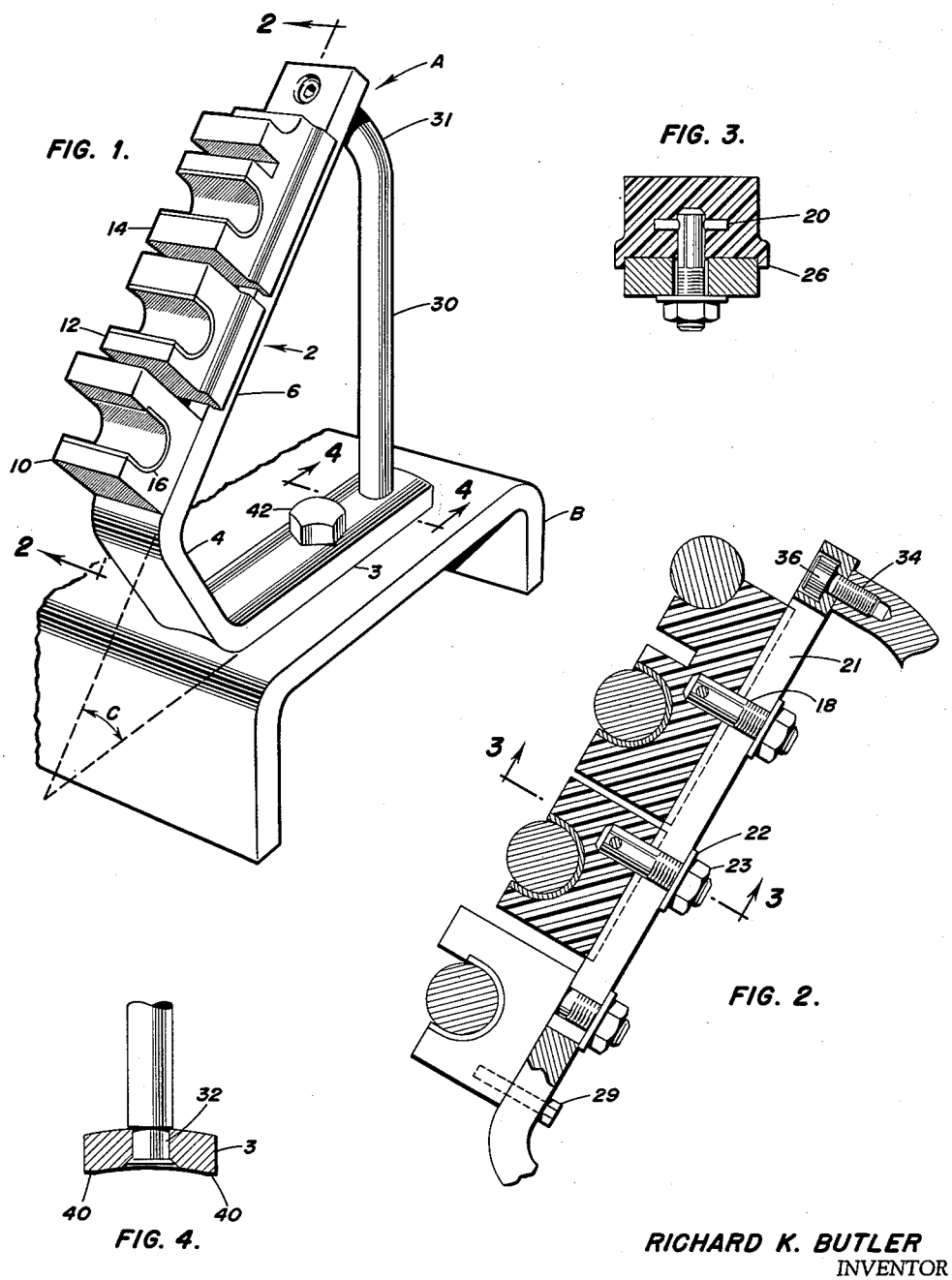
RICHARD K. BUTLER
INVENTOR
BY *Robillard & Pattison*
ATTORNEYS 3,079,647
Patented Mar. 5, 1963

3,079,647
BOTTOM ROLL STAND
Richard K. Butler, Whitman, Mass., assignor to Union Screw and Manufacturing Company, Pittsburgh, Pa., a corporation of Pennsylvania
Filed Sept. 9, 1960, Ser. No. 55,037
2 Claims. (Cl. 19—294)

The present invention relates to spinning, roving and drawing frames, and more particularly to improved bearing stands for the bottom rolls thereof.

It has been common practise in the textile industry to provide bearing stands for the bottom rolls wherein the front roll bearing is cast integral with the bearing stand. The cast stands are heavy and bulky and present a substantial amount of surface area upon which lint accumulates. Inasmuch as the support and front roll bearings are integral and if any damage results to either, the stand must be discarded.

The fact that the front roll bearing is integral with the stand also necessitates accurate adjustment of the entire bearing stand relative to the bottom roller. Moreover, because of the required angular relationship between the bearing supporting surface and the base of the support, extreme accuracy must be obtained in the casting and in the finishing of the bottom surface thereof.

The object of the present invention is to provide a bottom roll stand which eliminates the need for castings, is extremely simple to manufacture, and may readily be mounted onto the frame to assure proper angular relationship between the stand and the roller bearings.

A further object is to provide a roll stand wherein the front roll bearing as well as the middle and top roll bearings are all adjustable. These and other features of the invention will be readily understood from the following description when read in view of the accompanying drawings:

FIG. 1 is a perspective view of the bearing stand.
FIG. 2 is a sectional view taken on line 2—2 of FIG. 1.
FIG. 3 is a view taken on line 3—3 of FIG. 2.
FIG. 4 is a view taken on line 4—4 of FIG. 1.

Referring to the drawings "A" designates the roll stand and "B," the roll beam or intermediate beam of a spinning, roving and drawing frame upon which the roll stand is mounted.

The roll stand comprises an integral member 2 which may be ⅜ by 1⅜ steel bar stock, though obviously, it may be made of any suitable material having sufficient rigidity for the purpose intended. As clearly seen in FIG. 1, the member 2 is formed to provide a base arm 3, a spacing 4 extending upwardly at an obtuse angle to the base arm 3 and a bearing support arm 6, extending rearwardly from the spacer arm at an acute angle "C" to the base arm 3, the angle "C" being either 30° or 60° these being the standard angular relationships adopted throughout the industry.

The bearing support arm 6 has an elongated slot 21 and has adjustably secured therein a front roll bearing block 10, a middle roll bearing block 12 and back roll bearing block 14. The bearing blocks are molded from any suitable plastic and incorporated in each is a roll bearing member 16 of bronze or any other anti-friction material. Each block also has a holding stud 18 molded therein the upper end of each stud having an anchor pin 20 extending transversely through an opening therein to securely anchor the stud within the block. The studs 18 are of sufficient length to extend through the elongated slot 21 provided in the bearing support arm 6 of the roll stand member 2 (see FIG. 2) and the lower ends of the studs are threaded to receive a suitable washer 22 and nut 23 for adjustably securing the bearing block in position on the roll stand.

As best seen in FIG. 3 the middle roll block 12 and rear roll block 14 are each provided with flanges 26 depending from the side edges thereof for engaging the side edges of the bearing support arm 6 for restraining the bearing blocks against lateral or turning movement. With the arrangement described, it can be readily seen that the middle and rear bearing blocks may be longitudinally adjusted along the bearing support arm 6 to any required position.

As best seen in FIG. 2 the front bearing block 10 is also adjustable longitudinally of the bearing support 6. After being properly positioned longitudinally relative to the bottom roll, the front bearing block 10 may then be secured in position by simply drilling and tapping through the bearing support arm 6 and into the bearing block for reception of a holding screw 29 (see FIG. 2).

In order to provide maximum rigidity for the roll stand, the outer ends of the base arm 3 and bearing support arm 6 are interconnected by a strut 30 extending vertically from the base arm and having a slight goose neck turn at its upper end 31 to bring it into proper angular relationship with the bearing support arm 6. The lower end of the strut 30 has a reduced portion 32 extending through an opening in the base arm 3, whereupon the lower end of the strut is peaned to secure it in position. The upper end of the strut 30 is drilled and tapped at 34 to receive a tap bolt 36 extending through a suitable opening in the bearing support arm 6. The strut 30 is preferably made of round stock to present minimum surface area and edges further reducing lint adherence.

As previously stated the bearing support arm 6 must be at an angle of 30 or 60° relative to the roller beam or intermediate roller beam upon which the roll stand is mounted. To accomplish this and assure accuracy in mounting, the base arm 3 is formed with a slight concavity as best seen in FIG. 4. With the base formed, the bottom thereof may then be ground to provide parallel longitudinally extending edge flats 40 at the desired 30° or 60° angle to the face of the bearing support arm 6, with this done when the roll stand is secured to the roller beam as by a bolt 42 proper angular relationship will be assured.

From the foregoing it will be seen that the roll stand "A" is a relatively light substantially right angular triangle rigid member, the hypothenuse of which constitutes the bearing block support. In addition to being substantially lighter than the cast roller stands now being utilized the disclosed roll stand has equal rigidity with substantially less exposed surface area. The surface areas may also be treated to give them a high finish, such as by painting or plating, thus further minimizing the tendency for lint adherence. In view of the fact that ordinary bar stock may be used and the entire stand made by simple operations, it is far less costly to manufacture, than those presently in use.

The installation of the roll stand is further simplified because of the adjustability of the bearing blocks and particularly the adjustability of the front roll bearing block. Likewise, the manufacture of these blocks from plastic further reduces the cost of production.

Although the preferred embodiment has been described, it is possible to make certain modifications without departing from the scope of the invention as defined in the claims.

The following is claimed:
1. A bearing stand comprising
   (a) an integral rigid member having a base arm,
   (b) a bearing support arm extending at a predetermined acute angle relative said base arm,
   (c) said bearing support arm having an elongated slot,
   (d) said base arm being concave and formed with parallel flats along each outer bottom edge thereof, and (e) a plurality of roll bearing blocks carried on said bearing arm, (f) each of said roll bearing blocks being formed of molded plastic, (g) a stud connected to each of said blocks for extending through said slot, (h) nut means threaded to each of said studs for rendering each of said bearing blocks adjustable relative said bearing support arm, (i) some of said blocks each having depending flanges for embracing the side edges of the bearing support arm for restraining the same against lateral or turning movements (j) and a holding means for fixing one said roller bearing in adjusted position.

2. A bearing stand comprising (a) an integral rigid member having a base arm, (b) a spacing arm extending upwardly at an obtuse angle to said base arm, (c) a bearing support arm extending from said spacing arm at a predetermined acute angle relative said base arm, (d) said bearing support arm having an elongated slot, (e) said base arm being concave and formed with parallel flats along each outer bottom edge thereof, and (f) a plurality of bearing blocks carried on said bearing arm, (g) including a front roll bearing block, a middle roll bearing block, and a rear roll bearing block, (h) each of said roll bearing blocks being formed of molded plastic, (i) an anti-friciton bearing nested in each of said blocks, (j) a stud secured to each of said blocks for extending through said slot for securing the respective bearing blocks to the support arm, (k) nut means threaded to each of said studs for adjustably securing said bearing blocks to said bearing support arm, (l) said middle block and rear roll block each having depending flanges for embracing the side edges of the bearing support arm for restraining the same against lateral turning movements, (m) and a holding means for fixing said front roller bearing in adjusted position.

References Cited in the file of this patent

UNITED STATES PATENTS

| | | |
|---|---|---|
| 2,597,278 | Arundale et al. | May 20, 1952 |
| 2,728,111 | Werth et al. | Dec. 27, 1955 |